(12) United States Patent
Betcher et al.

(10) Patent No.: US 9,257,807 B2
(45) Date of Patent: Feb. 9, 2016

(54) TOOL FOR INSTALLING WIRES IN A WIRE HARNESS CONDUIT

(71) Applicants: Service Solutions U.S. LLC, Warren, MI (US); Robert Bosch GmbH, Stuttgart (DE)

(72) Inventors: Larry W. Betcher, Northfield, MN (US); Dirk Skogerboe, Faribault, MN (US); Jacob Hanson, Owatonna, MN (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 178 days.

(21) Appl. No.: 13/756,191

(22) Filed: Jan. 31, 2013

(65) Prior Publication Data

US 2014/0208585 A1    Jul. 31, 2014

(51) Int. Cl.
*H01R 43/22*    (2006.01)
*H02G 1/08*    (2006.01)

(52) U.S. Cl.
CPC ............... *H01R 43/22* (2013.01); *H02G 1/085* (2013.01); *Y10T 29/53213* (2015.01); *Y10T 29/53283* (2015.01); *Y10T 29/53909* (2015.01)

(58) Field of Classification Search
CPC ........ H02G 1/085; B25B 25/00; B25B 33/00; B25B 23/0035; D04C 7/00; Y10T 29/53909; Y10T 29/53283; H01R 43/22
USPC .................................. 254/134.3 R, 134.3 FT
See application file for complete search history.

(56) References Cited

U.S. PATENT DOCUMENTS

| | | | | | |
|---|---|---|---|---|---|
| 942,732 | A | * | 12/1909 | Morford | ........................ 140/117 |
| 4,211,446 | A | * | 7/1980 | Shultz, Sr. | ...................... 294/26 |
| 4,828,690 | A | * | 5/1989 | Montez | ......................... 209/418 |
| 6,751,829 | B2 | | 6/2004 | Bergstrom | |
| 6,802,494 | B1 | | 10/2004 | Fischer | |
| 6,862,958 | B2 | * | 3/2005 | Schade | ......................... 81/177.6 |
| 2007/0215234 | A1 | * | 9/2007 | Poole | ............................. 140/118 |
| 2011/0253756 | A1 | * | 10/2011 | Fitzpatrick et al. | ........... 223/102 |

FOREIGN PATENT DOCUMENTS

CN     202137295 U     2/2012
GB     13756191 A   *   3/1916

OTHER PUBLICATIONS

European Search Report on EP14153304.2 filed Jan. 30, 2014.

* cited by examiner

*Primary Examiner* — Livius R Cazan
(74) *Attorney, Agent, or Firm* — Baker & Hostetler LLP

(57) ABSTRACT

A wire handheld tool including a handle contiguous to a shank with a wire securing portion. The wire securing portion may be a relatively flat portion with one or more wire passageways used to secure one or more wires thereto. The wire handheld tool can be used to insert, remove, and/or replace wires contained in wire harness conduits. Some embodiments can include a plurality of passageways traversing the relatively wire securing portion in non-parallel diagonal directions relative to each other. In some embodiments, one wire passageway can be included and configured for a wire to traverse a length of the wire securing portion securing itself thereto. The handle of the tool can be ergonomically designed for comfort and practicality, and additionally, may include non-conductive components or coatings to prevent electrically shocking a user.

9 Claims, 4 Drawing Sheets

TOOL FOR INSTALLING WIRES IN A WIRE HARNESS CONDUIT

FIELD OF THE DISCLOSURE

The disclosure generally relates to a device used for installing wiring in a wire harness conduit. More particularly, a wire handheld tool used for inserting, replacing and/or guiding wiring into a wire harness conduit.

BACKGROUND OF THE DISCLOSURE

A number of fields currently benefit from an array of wire handling and wire containing techniques. Different techniques employ different tools and parts that can be used in order to contain and route wires in organized manners. Containing and managing wires are important for a number of reasons depending on the application including, for example, keeping the wires contained to minimize tripping hazards, routing wires in spaces that can sometimes become difficult to access, preventing wire entanglement with equipment, protecting wiring, and the like.

Some techniques commonly used include the use of wire harness conduits to organize, contain and route wires. For example, in many industries, such as the automotive industry, the use of wire loom split tubing is widely known and routinely used. Different devices specific to the construction and assembly of wiring have been developed as a consequence. Nevertheless, these devices are less than satisfactory due to the mechanisms employed to manage wires often being cumbersome and time consuming. For example, existing tools can require taping the wire onto the tool and/or using parts that can get tangled with nearby obstacles and other wires during their use.

Consequently, typically during installation, repairs, and replacement of wires, mechanics and electricians often find themselves using their finger to push the wire into a wire harness conduit due to the lack of practicality of the currently available tools. Using fingers during repairs is also time consuming, can cause skin damage, expose a person to electrical shock, and may not always be possible due to space constrains and/or the type of wire harness conduit used. In many of these instances, mechanics and electricians are left with very few alternatives. These alternatives include running the new wire(s) on the outside of the wire harness conduit and/or having to cut open the wire harness conduit to add the new wire(s) and then try to reassemble the wire harness conduit. These options are also time consuming and often leave wires unprotected, damaged, and/or leave a visually unappealing assembly.

As a result of the foregoing, there is a need for a tool that can facilitate the installation and/or replacement of wires into wire harness conduits such as wire loom split tubing.

SUMMARY OF THE DISCLOSURE

Accordingly, the foregoing needs are met, to a great extent, by the present disclosure, wherein a wire handheld tool useful to insert, assemble and/or replace wires into constrained spaces such as wire harness conduits, wiring boxes, grommets, and constrained spaces is described. Accordingly, mechanics, engineers, and electricians may use the wire handheld tool to work on an automobile, airplane, machine, watercraft, power tool, and the like.

In some aspects of the disclosure, a wire handheld tool for at least one of inserting, removing and replacing a wire into a wire harness conduit includes a handle configured to be held by a user with a longitudinal shank with a first end connected to the handle and the longitudinal shank including a second end comprising a wire securing portion which can be configured to insert one or more wires into a wire harness conduit.

In some embodiments according to some aspects of the disclosure, the wire securing portion which can include a plurality of wire passageways configured to secure a wire thereto and guide it into the wire harness conduit. In some embodiments, one or more of the passageways may be configured to traverse the wire securing portion of the shank diagonally and/or in non-parallel diagonal non-parallel directions in relation to each other.

In additional embodiments according to aspects of the disclosure, the wire handheld tool can include a handle configured to be held by a user with a longitudinal shank with a first end connected to the handle and a second end including a wire securing portion. The wire securing portion can include a wire passageway configured to secure and guide one or more wires into the wire harness conduit. The wire passageway can be configured to traverse a length of the wire securing portion and may include a fastening part, such as a spring operated fastening part, configured to apply pressure on a wire passing through the passageway.

In some embodiments, the longitudinal shank may be straight or configured with one or more bends to facilitate managing it through rigid wire harness conduits. The handle may be of any geometric form and size for a user to easily grip the tool and manipulate the shank portion. In addition, the handle and/or shank may be made of or coated with a non-conductive composition to protect the user from being electrically shocked during repair due to damaged wires.

Related to the disclosure, a wire may include but is not limited to cables, lines, leads, fiber optic cables, and strings being inserted into a flexible, semi-rigid, or rigid split tube enclosing structure. The size of the wire securing portion and the shank can be proportional to the application and the size and properties of the wires being managed. In addition, the shank may be designed to fit in openings of existing wire harness conduits and to minimize disrupting neighboring wires and wired components.

There has thus been outlined, rather broadly, certain aspects of the disclosure in order that the detailed description herein may be better understood, and in order that the present contribution to the art may be better appreciated.

In this respect, before explaining at least one embodiment of the disclosure in detail, it is to be understood that the disclosure is not limited in its application to the details of the construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures for carrying out the several purposes of the disclosure. It is important, therefore, that the claims be regarded as including such equivalent constructions insofar as they do not depart from the spirit and scope of the disclosure.

DETAILED DESCRIPTION OF THE DISCLOSURE

Figure 1:
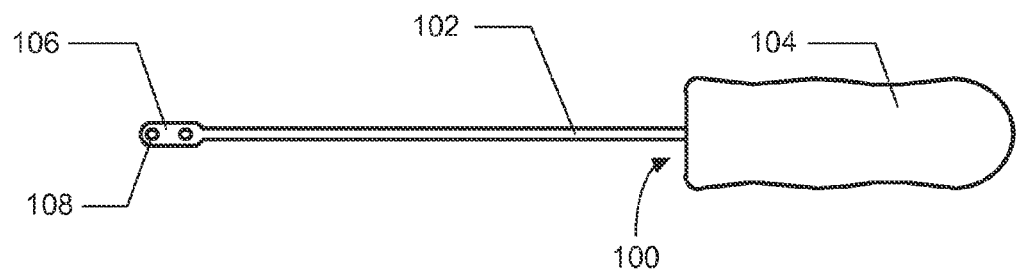
FIG. 1 is a side view of an exemplary wire handheld tool in accordance with some embodiments of the disclosure.

The disclosure will now be described with reference to the drawing figures. Throughout the description of the drawings, figures in which like reference numerals are used can refer to like parts throughout. However, any feature described in relation to any one aspect may be used alone, or in combination with other features described, and may also be used in combination with one or more aspects described or variations that will be readily apparent to those skilled in the art.

Referring now to FIG. 1, a side view of an exemplary wire handheld tool 100 in accordance with some embodiments of the disclosure is depicted. According to aspects of some embodiments of the disclosure, the wire handheld tool 100 includes a handle 104 contiguous to a longitudinal shaft or shank 102 with a wire securing portion 106 which can include one or more wire passageways 108 for one or more wire ends to be inserted and secured thereto.

The handle 104 may be of any geometric shape that allows a user to hold the wire handheld tool 100. In some embodiments, the handle 104 may be of an ergonomic geometric shape that provides for a comfortable grip to the user. For example, a generally cylindrical shaped handle 104 that can conform to the closed hand of a user. Some wire handheld tools 100, within the scope of the disclosure, used for the assembly and repair of small devices may include a differently shaped or sized handle 104 that provides for user control by simply grabbing the handle 104 with three or fewer fingers.

Figure 4:
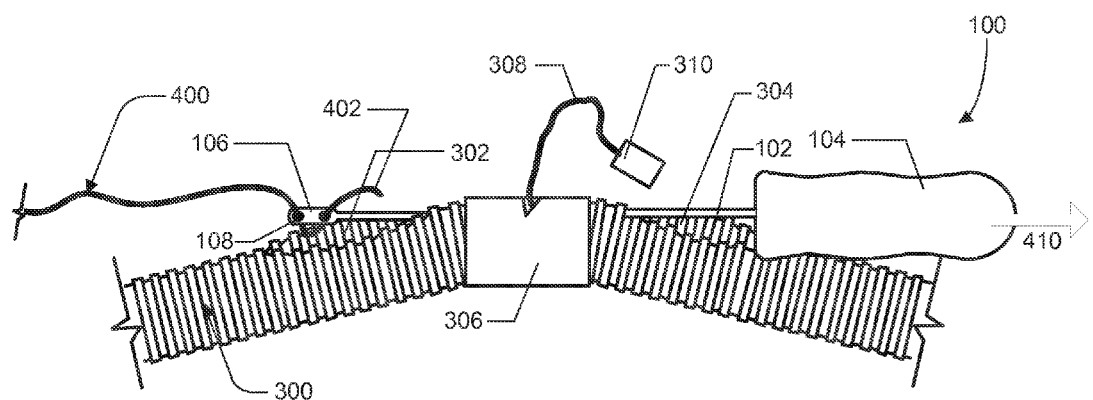
FIG. 4 is a side view representation illustrating the exemplary wire handheld tool of FIG. 1 going through a wire harness conduit and having a wire secured thereto in accordance with some aspects of the disclosure.

In some embodiments, the handle 104 may be a rigid structure of a non-conductive composition or a metal composition with a non-conductive coating to protect a user from electrical shock when the wire handheld tool 100 comes into contact with a damaged wire 400 (FIG. 4). Rigid and non-conductive materials can include polymers, ceramic compositions, or the like. Suitable polymers include but are not limited to rigid plastics, rubbers, acrylics, nylons, polystyrenes, polyvinylchlorides, polycarbonates, polyurethanes, polyethylenes, polypropylenes, polyamides, polyethers, polyesters, polyolefins, polyacrylates, polyisoprenes, fluoropolymers, combinations thereof or the like. In some additional embodiments, the handle 104 may also include a sponge like heat and/or electrically insulating foam material covering a rigid portion of the handle 104 that can provide additional comfort and safety.

The shank 102 may be an elongated longitudinal and relatively rigid component with a first end being contiguous to the handle 104 and further having a second end with the wire securing portion 106. The shank's 102 elongated longitudinal structure can be functional to fit, for example, in a first opening 304 (FIG. 3) of a wire harness conduit 300 (FIG. 3), including for example wire loom split tubing, and engage a wire 400 (FIG. 4) by securing a wire end 402 to the wire securing portion 106 and insert the wire 400 (FIG. 4) into the wire harness conduit 300 (FIG. 3) by control of the handle 104.

Figure 3:
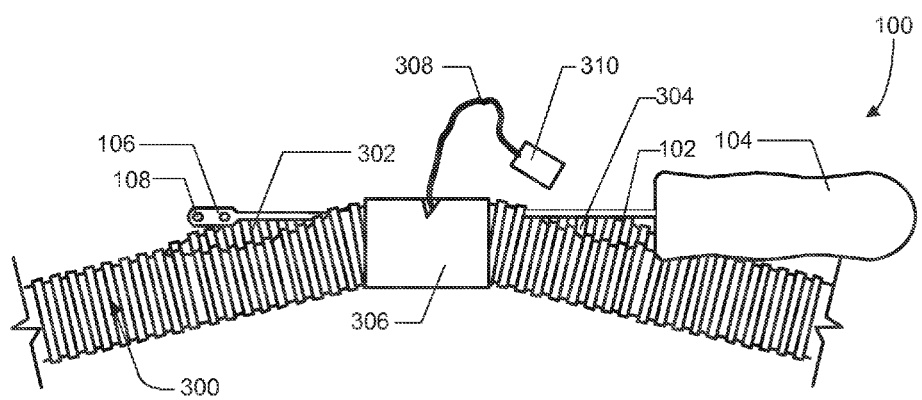
FIG. 3 is a side view representation illustrating the exemplary wire handheld tool of FIG. 1 going through a wire harness conduit in accordance with some aspects of the disclosure.

In some embodiments of the disclosure, the shank's 102 elongated longitudinal shape may include one or more bends that may be useful, for example, to insert and guide the wire along a portion of the wire harness conduit 300 (FIG. 3.) The one or more bends of the shank 102 can result in a curvilinear structure that can aid in the use of the wire handheld tool 100. As a consequence, depending on the application, in some embodiments the shank 102 may be straight or include bends, each with a radial length that is proportional to the angular curvature to avoid sharp transitions that can interfere with surrounding wire(s) and/or parts. In addition, the composition of the shank 102 may also be of a non-electrically conductive material and/or may allow for some bending through the application of force in order to accommodate the wire handheld tool 100 in tight working spaces or to customize the tool during use as desired by the user.

Figure 2:
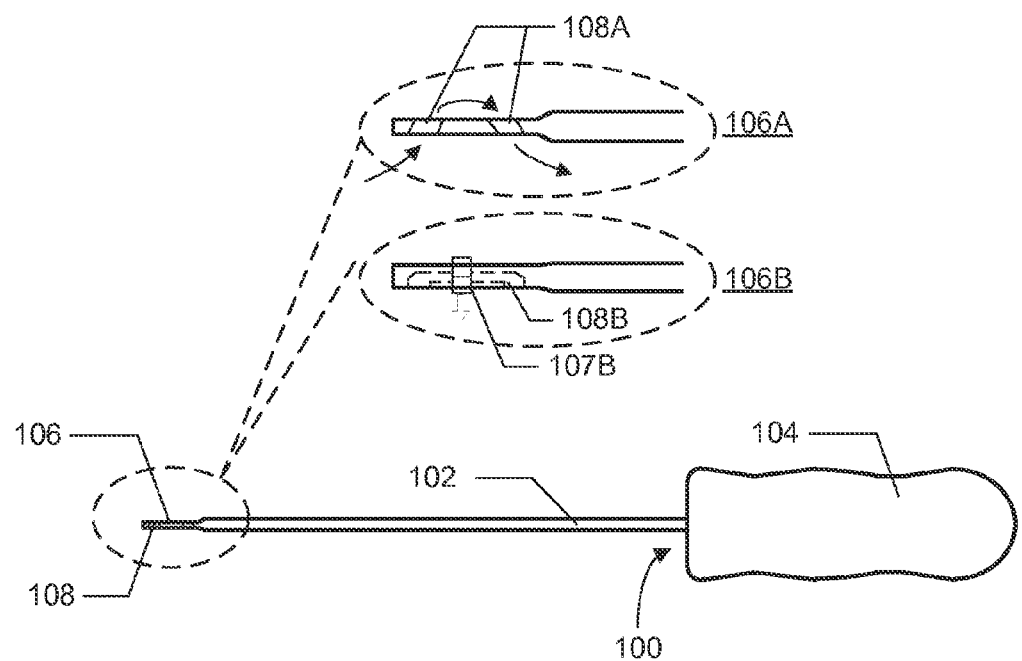
FIG. 2 is another side view of the exemplary wire handheld tool in FIG. 1 in accordance with some embodiments of the disclosure.

Referring now to FIG. 2, another side view of the exemplary wire handheld tool 100 in FIG. 1 is depicted. According to aspects of some embodiments of the disclosure, the wire securing portion 106 of the wire handheld tool's 100 shank 102 can be configured to include a one or more wire passageways 108. Wire passageways' 108 sizes and configurations can vary depending on the field and the properties of the wire(s) including, for example, rigidity, diameter, and fragility.

In one example, a wire securing portion 106A can include two or more separate wire passageways 108A configured to facilitate the insertion of a wire (not shown in FIG. 2.) As depicted, the two wire passageways 108A may be diagonal converging/nonparallel openings that can facilitate inserting a relatively rigid but still flexible wire's end (not shown in FIG. 2) through each of the two wire passageways 108A, in the direction of the arrows according to one embodiment. Inserting a wire's end through both openings may be done relatively quickly and provide sufficient friction and/or with the rigidness of the inserted wire end (not shown in FIG. 2), secure the wire end (not shown in FIG. 2) to manage the wire (not shown in FIG. 2) using the handle 104.

In the event that less rigid wire (not shown in FIG. 2) is being worked with and in another embodiment, the wire may be inserted through the two wire passageways 108A in the opposite direction of the arrows to increase the friction and thereby prevent the wire from coming lose while is being managed. A greater number of wire passageways 108A may also be included in the event it is required for even less rigid and more flexible wire types. In addition, a tacky/sticky component such as a rubber seal may be included in some embodiments in at least a portion of one or more passageways 108 included to provide greater friction as it may be desired for some wire types.

In another example, a wire securing portion 106B can include one wire passageway 108B configured to allow inserting a wire end (not shown in FIG. 2) thru a section inside the wire securing portion 106B. An optional fastening part 107B can be included to provide pressure and help secure the wire when the wire (not shown in FIG. 2) is thin and not as rigid. The optional fastening part 107B can include, for example, a biasing element 107B that biases onto the wire (not shown in FIG. 2) when it is not being pressed by the user. In this type of embodiment, at least a portion of the fastening part may be spring operated. A user may press the fastening part 107B to thereby align an opening (not shown) of the fastening part 107B with the wire passageway 108B to allow for a wire to pass through and be secured upon release of the fastening part 107B. Accordingly, the design configuration of the wire securing portion 106, size and shape of the wire passageways 108, length of the shank 102, handle 104 and size of the wire handheld tool 100 may depend on the size and rigidity of the wires involved in particular applications.

Referring now to FIG. 3, a side view representation illustrating the exemplary wire handheld tool 100 of FIG. 1 going through a wire harness conduit 300 (shown opaque) is depicted. In particular, the shank 102 of the wire handheld tool 100 has been inserted through a first opening 304 and is coming out of a second opening 302 that is subsequent to an enclosure 306. The enclosure 306 may include, for example, a fastener, electrical tape, or the like used during the assembly of the wire harness conduit 300 to project an end of a wire 308 out of the wire harness conduit 300 and provide a connection to a wired component 310.

In some embodiments, the generally flat design of the wire securing portion 106 may facilitate the inserting of the shank 102 in existing assemblies by decreasing the possibility of significantly disrupting other neighboring wires (not shown). Preventing disruption of neighboring wires can be important, as it can sometimes result in wired components being disconnected from the disrupted wire(s) and/or cause damage the disrupted wire(s). In accordance with the disclosure, for applications in which the wire harness conduit 300 is not flexible wire loom split tubing and/or the tubing is secured onto a flat surface, the handle 104 and/or the shank 102 of the wire handheld tool 100 may include a bend to facilitate managing the shank 102 while it is inserted in the wire harness conduit 300.

Referring now to FIG. 4, a side view representation of the exemplary wire handheld tool 100 of FIG. 1 going through the wire harness conduit 300 (shown opaque) and having a wire end 402 secured thereto is illustrated. As depicted in FIG. 3, the shank 102 of the wire handheld tool 100 has been inserted through a first opening 304 and is coming out of a second opening 302 that is subsequent to an enclosing 306. Subsequent to it, the wire securing portion 106 of the shank 102 can be used to secure the wire end 402 thereto to then manage and/or insert the wire 400 into the wire harness conduit 300. The wire end 402 may be inserted through the wire passageways 108 in various manners, depending on the wire's properties, to provide sufficient resistance for the wire 400 to remain secured to the wire securing portion 106.

Subsequent to securing the wire 400 to the wire securing portion 106 of the shank 102, the user may use the wire handheld's 100 handle 104 to manage the wire 400, including for example, leading it to come out of the first opening 304 by pulling the handle 104 in the direction of arrow labeled 410. Subsequent to inserting/managing the wire 400 into the wire harness conduit 300 as it may be desired by the user, the user may with just as much ease remove the wire end 402 from the wire securing portion 106 during use.

Figure 5:
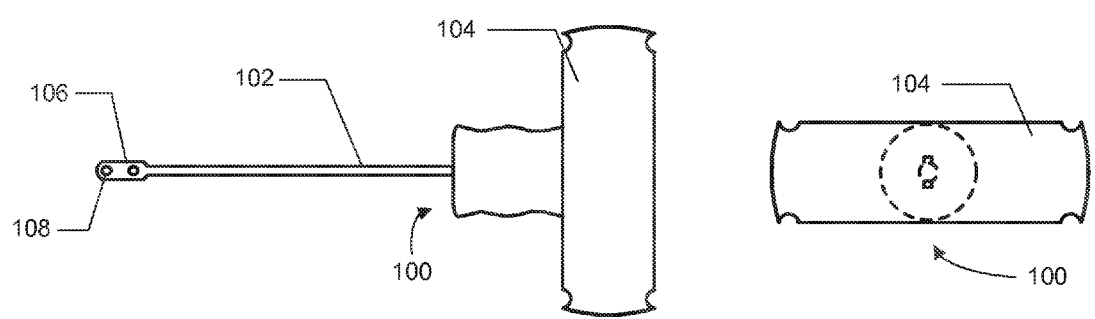
FIG. 5 illustrates another exemplary wire handheld tool in accordance with some embodiments of the disclosure.

Referring now to FIG. 5, a side view and top view of another exemplary wire handheld tool 100 is depicted. In the present exemplary embodiment, the handle 104 is designed to be T-shaped to allow a user to ergonomically grab the wire handheld tool 100, rotate the shank 102, and comfortably pull the wire 400 into and out of the wire harness conduit (not shown in FIG. 5) in accordance with the disclosure. In other embodiments, other handle 104 configurations are also within the scope of the disclosure and may be included in the wire handheld tool 100 depending on the application/types of wire(s) 400 used.

Figure 6:
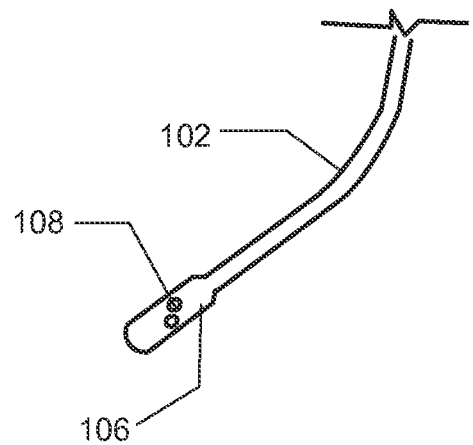
FIG. 6 illustrates a portion of the shank with an exemplary wire securing end configured in relation to a bend in the shaft that may be useful in some embodiments of the disclosure.

Referring now to FIG. 6, a portion of the shank 102 with an exemplary wire securing portion 106 configured in relation to a bend in the shank 102 is depicted. In particular, the exemplary embodiment illustrates a generally flat surface of the wire securing portion 106 being on the same plane as the direction of the bend of the shank 102. This can be useful to minimize disrupting and/or causing damage of neighboring wires (not shown) that may be present inside the wire harness conduit 300 (shown in FIG. 3.) In addition, while the number of bends and/or the angular curvature of the shank 102 are not limited, in some embodiments it may be desired that the radial length of each bend is proportional to the angular curvature to avoid any sharp transitions of the shank 102 that can interfere with surrounding wire(s) and/or parts.

In additional aspects of the exemplary wire securing portion 106 embodiment, the wire passageways 108 may be located in a nonlinear arrangement along the length of the wire securing portion 106, as depicted. The particular arrangement design of some embodiments may also be functional to increase or decrease the resistance securing the wire as it may be desired.

Figure 7:
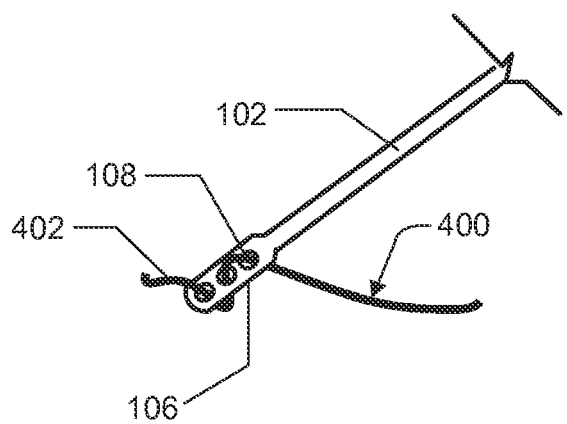
FIG. 7 illustrates a portion of the shank with another exemplary wire securing end that may be useful in some embodiments of the disclosure.

Referring now to FIG. 7, a portion of the shank 102 with another exemplary wire securing portion 106 that may be useful in some embodiments of the disclosure is depicted. In particular, the exemplary wire securing portion 106 can be useful to provide greater resistance and secure a wire 400 that is relatively more flexible. The wire end 402 may be inserted through the respective wire passageways 108 starting at either end depending on the considerations of the particular job. However, the wire end 402 is illustrated as it having been inserted through the wire passageway 108 closest to the handle 104 and proceeding to the second and then third wire passageways 108, accordingly. Although the wire handheld tool 100 can allow for a knot to be formed with the wire 400 after it is inserted through one of the wire passageways 108 to secure the wire 400 thereto, some aspects of the disclosure include the avoidance of having to tie and/or form a knot onto the tool, but instead providing a useful wire handheld tool 100 that can provide sufficient resistance to secure the wire 400 in a quicker and relatively easier way.

In addition, while the disclosure generally refers to a wire handheld tool 100 for one or more wire(s), the use and scope of the disclosure is not limited just to wire(s) but includes other flexible elongated components such as cables, flexible tubing, lines, cords, strings, ropes, and the like. Accordingly, the wire securing portion 106 may be designed according to aspects of the disclosure and the type of flexible elongated component to be managed.

It is to be understood that any feature described in relation to any one aspect may be used alone, or in combination with other features described, and may also be used in combination with one or more features of any other of the disclosed aspects, or any combination of any other of the disclosed aspects.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A handheld wire tool for replacing a wire in a wire harness conduit, the handheld wire tool comprising:
   a handle configured to be held by a user;
   a longitudinal shank with a longitudinal axis, a first end connected to the handle and a second end; and
   a wire securing portion at the second end of the longitudinal shank, wherein the wire securing portion is flat and includes a wire passageway configured to receive and secure a wire, wherein the wire passageway is positioned along the longitudinal axis, the wire securing portion further comprising a fastening part including a biasing element wherein pressing the fastening part aligns an opening of the fastening part with the wire passageway to allow for the wire to pass through and releasing the fastening part biases the biasing element against the wire to secure it.

2. The wire handheld tool of claim 1, wherein the wire passageway includes a first opening and a second opening on the wire securing portion to receive the wire.

3. The wire handheld tool of claim 1, wherein the handle comprises an ergonomically designed T-Shape.

4. The wire handheld tool of claim 1, wherein the handle comprises one or both of a rigid non-conductive composition and an insulating material.

5. The wire handheld tool of claim 1, wherein the handle comprises a non-conductive coating.

6. The wire handheld tool of claim 1, wherein the longitudinal shank is configured to be bent to conform to a restricted working space.

7. A handheld wire tool for replacing a wire in a wire harness conduit, the handheld wire tool comprising:
   a handle configured to be held by a user;
   a longitudinal shank with a first end connected to the handle and a second end; and
   a wire securing portion at the second end of the longitudinal shank, the wire securing portion having a wire passageway traversing a flat portion of the wire securing portion, the wire securing portion further comprising a fastening part including a spring, wherein pressing the fastening part aligns an opening of the fastening part with the wire passageway to allow for a wire to pass through and releasing the fastening part biases a biasing element against the wire to secure it.

8. The wire handheld tool of claim 7, wherein the handle comprises one or both of a rigid non-conductive composition and an insulating material.

9. A handheld wire tool for replacing a wire in a wire harness conduit, the handheld wire tool comprising:
   a handle configured to be held by a user;
   a longitudinal shank with a first end connected to the handle and a second end; and
   a wire securing portion at the second end of the longitudinal shank including a wire passageway, wherein the wire passageway path traverses a portion along the length of a generally flat wire securing portion, the wire securing portion further comprising a fastening part including a biasing element, wherein pressing the fastening part aligns an opening of the fastening part with the wire passageway to allow for a wire to pass through and releasing the fastening part biases the biasing element against the wire to secure it.

* * * * *